(12) United States Patent
Anand et al.

(10) Patent No.: US 8,301,840 B2
(45) Date of Patent: Oct. 30, 2012

(54) ASSIGNING CACHE PRIORITIES TO VIRTUAL/LOGICAL PROCESSORS AND PARTITIONING A CACHE ACCORDING TO SUCH PRIORITIES

(75) Inventors: Vaijayanthimala K. Anand, Austin, TX (US); Diane G. Flemming, Pflugerville, TX (US); William A. Maron, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 12/637,891

(22) Filed: Dec. 15, 2009

(65) Prior Publication Data

US 2011/0145505 A1    Jun. 16, 2011

(51) Int. Cl.
*G06F 12/12* (2006.01)
(52) U.S. Cl. ..................................................... 711/133
(58) Field of Classification Search ......................... None
See application file for complete search history.

(56) References Cited

U.S. PATENT DOCUMENTS

| 7,140,021 | B2 | 11/2006 | Srinivas et al. | |
|---|---|---|---|---|
| 7,370,331 | B2 | 5/2008 | Brenner | |
| 7,617,375 | B2 | 11/2009 | Flemming et al. | |
| 2003/0229760 | A1* | 12/2003 | Doyle et al. | 711/134 |
| 2007/0067435 | A1 | 3/2007 | Landis et al. | |
| 2007/0169127 | A1 | 7/2007 | Kashyap | |
| 2008/0077927 | A1 | 3/2008 | Armstrong et al. | |

OTHER PUBLICATIONS

"System and Method to Optimize Cache and Memory Affinity in a Virtualized Environment", IBM Corporation, IPCOM000133807D, Feb. 9, 2006, 5 pages.

* cited by examiner

*Primary Examiner* — Duc Doan
(74) *Attorney, Agent, or Firm* — Stephen J. Walder, Jr.; Matthew B. Talpis (57) ABSTRACT

Mechanisms are provided, for implementation in a data processing system having at least one physical processor and at least one associated cache memory, for allocating cache resources of the at least one cache memory to virtual processors of the data processing system. The mechanisms identify a plurality of high priority virtual processors in the data processing system. The mechanisms further determine a percentage of cache lines of the at least one cache memory to be assigned to high priority virtual processors. Moreover, the mechanisms mark a portion of the cache lines in the at least one cache memory as being evictable by only high priority virtual processors based on the determined percentage of cache lines to be assigned to high priority virtual processors. The marked portion of the cache lines cannot be evicted by lower priority virtual processors having a priority lower than the high priority virtual processors.

21 Claims, 4 Drawing Sheets

ASSIGNING CACHE PRIORITIES TO VIRTUAL/LOGICAL PROCESSORS AND PARTITIONING A CACHE ACCORDING TO SUCH PRIORITIES

BACKGROUND

The present application relates generally to an improved data processing apparatus and method, and more specifically to mechanisms for assigning cache priorities to virtual/logical processors and partitioning a cache according to such priorities.

Logical partitioning of computer resources allows the establishment of multiple system images within a single physical machine or processor complex. Virtualization is a term designating system imaging in which each system image, known also as a virtual machine (VM), operates in a logically independent manner from the other VMs using shared resources of the physical computer system. In this manner, each logical partition corresponding to a VM can be independently reset, loaded with an operating system that may be different for each partition, and operate with different software programs using different input/output (I/O) devices. Commercial embodiments of logically partitioned systems include, for example, International Business Machines (IBM) Corporation's POWERS multiprocessor architecture.

An important aspect of logical partitioning is management of the respective partition workloads. In POWERS, for example, a workload manager called a hypervisor manages the workload among the partitions. In this type of shared resource environment, the hypervisor allocates physical system resources such as memory, central processing units (CPUs), I/O, etc., to the logical partitions using an interleaved time slot scheduling technique similar in a broad sense to general multitask computing scheduling. The hypervisor attempts to balance the workload of the partitions by dispatching partition work as logical processors to the physical system resources on an as-needed and/or pre-allocated manner.

One aspect of partition scheduling relates specifically to processor resource utilization and sharing. Namely, partitions using processor capacity from a shared processor pool are defined as either capped or uncapped for scheduling purposes. A capped partition cannot exceed its configured processor entitlement. Uncapped support for logical partitions enables uncapped partitions to exceed their configured capacity in situations where there is unutilized capacity in the shared processor pool. Such unutilized capacity results from other partitions underutilizing all of their configured capacity or the capacity of the shared pool otherwise not being completely allocated.

When dispatched, a logical partition subsumes the allocated physical processor resources as a virtual processor. The scheduling of virtual processors entails allocating pre-specified periods of time, or time slices, during which processing cycles, memory, and other physical system resources are allocated for use by the partitions during a given dispatch window. The AIX operating system running on POWERS, for example, has a default 10 milliseconds dispatch window. Any unused portion of an allocated dispatch window may be allocated to one or more of the uncapped partitions in the system. A lottery mechanism based on the uncapped partitions' priority levels is often utilized to determine which uncapped partition will replace the originally scheduled partition for the unused portion of the dispatch window.

With the PowerVM technology, a system can be configured to have more logical partitions, and thus, logical or virtual processors, than available physical processors as the logical partitions are allowed to have entitlements to the physical processors and system resources in fractional units. The hypervisor ensures that all the logical partitions, as logical or virtual processors, are allotted their share within the dispatch window of time. As a result, logical or virtual processors may end up sharing a physical processor and its resources in a serial way, i.e. one after another.

The physical processors along with their caches that are shared in this manner pose an issue to performance of the system as a whole. As each logical or virtual processor is given its allotment of system resources, the logical or virtual processor clears out the contents of the previous logical or virtual processor's cached data if the current logical or virtual processor's working set of data is different from the previous working set of the previous logical or virtual processor. This impacts performance of the virtual processors as it causes the virtual processors to start with a cold cache at every dispatch window. A cold cache causes cache misses initially until the required data is retrieved from system memory and placed in the cache, thereby causing extra overhead costs with regard to processor cycles to check the cache, determine the cache miss, and retrieve the required data from system memory.

SUMMARY

In one illustrative embodiment, a method, in a data processing system having at least one physical processor and at least one associated cache memory, for allocating cache resources of the at least one cache memory to virtual processors of the data processing system. The method comprises identifying, by a management mechanism of the data processing system, a plurality of high priority virtual processors in the data processing system. The method further comprises determining, by the management mechanism, a percentage of cache lines of the at least one cache memory to be assigned to high priority virtual processors. Moreover, the method comprises marking, by the management mechanism, a portion of the cache lines in the at least one cache memory as being evictable by only high priority virtual processors based on the determined percentage of cache lines to be assigned to high priority virtual processors. The marked portion of the cache lines cannot be evicted by lower priority virtual processors having a priority lower than the high priority virtual processors.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for assigning cache priorities to virtual processors, or logical partitions (which may comprise a plurality of virtual processors) of a data processing system. In accordance with the mechanisms of the illustrative embodiments, virtual processors (hereafter referred to as simply virtual processors), or even a logical partition with all of its associated virtual processors, may be assigned a higher priority than other virtual processors or logical partitions that share the physical processors. The hypervisor, or other virtualization intermediary device responsible for managing and scheduling access to system resources by virtual processors and/or logical partitions, distinguishes the higher priority virtual processor form normal priority (or lower priority) virtual processors.

The normal/lower priority virtual processors, when dispatched by the hypervisor, are restricted to use only a sub-portion, e.g., half, of the processor caches. The higher priority virtual processors are allowed to use the entire cache. This ensures that the normal/lower priority virtual processors will not evict all of the cache lines when they are dispatched but only a sub-portion of the cache lines, leaving the other portions of the cache line in the cache. As a result, if the previous higher priority virtual processor is again dispatched to use these same physical processor and cache resources, the higher priority virtual processor will start with a "warm" cache in that the cache lines that were not evicted when the normal/lower priority virtual processor was dispatched are still present in the cache. Thus, memory accesses performed by the virtual processor may be more likely to find the data in cache, thereby increasing performance of the virtual processor over the "cold" cache starts of the known mechanisms.

In order to increase the possibility that such performance improvements occur, the same higher priority virtual processor is preferably dispatched multiple times sandwiched with the same or different normal/lower priority virtual processors on the same physical processor and associated cache. In order to achieve this, the hypervisor may sub-divide its shared pool of virtual processors into groups or domains where virtual processors of the same logical partition that have higher priorities are grouped with a set of normal/lower priority virtual processors. This grouping enforcement is achieved only loosely, however, as the higher goal of the hypervisor is to maximize system utilization. Thus, if a situation arises where the hypervisor cannot dispatch virtual processors in an interleaved manner where high priority virtual processors are followed by a normal/lower priority virtual processor, the hypervisor may disturb this dispatch order temporarily to achieve maximum system utilization. However, as soon as the hypervisor can restore this interleaved dispatch order, the hypervisor will do so in order to maximize performance.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
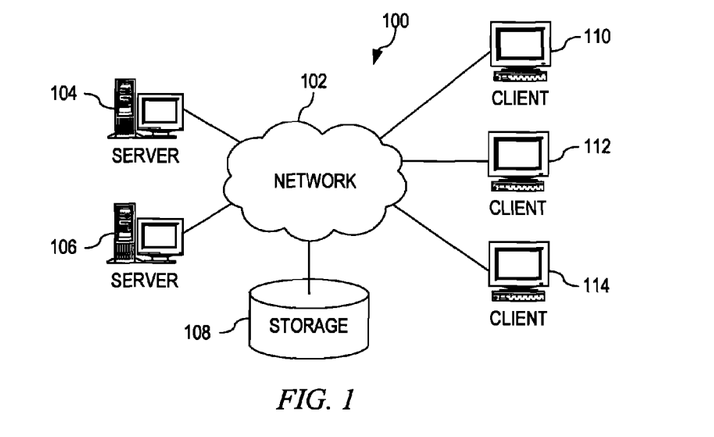
FIG. 1 is a pictorial representation of an example distributed data processing system in which aspects of the illustrative embodiments may be implemented.
Figure 2:
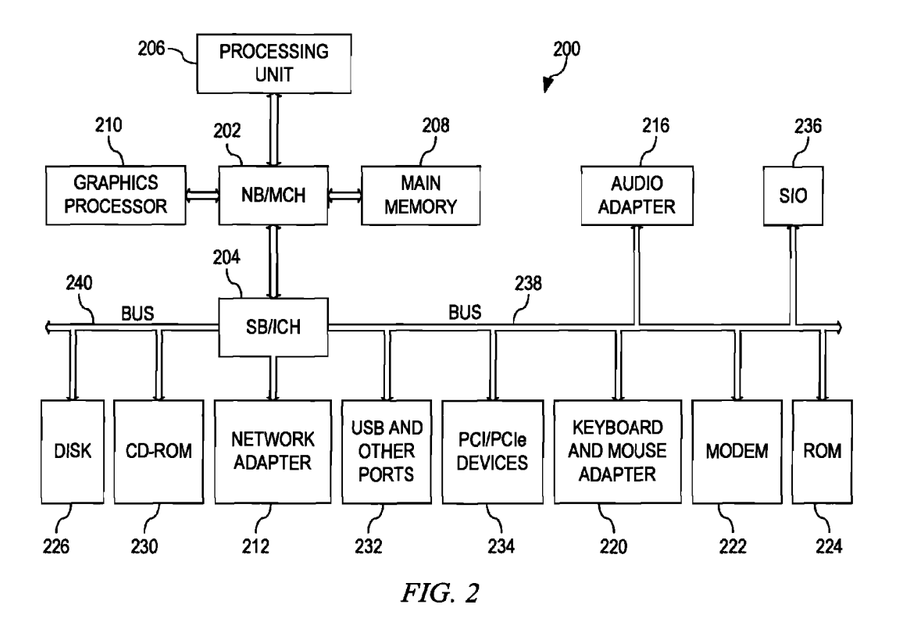
FIG. 2 is a block diagram of an example data processing system in which aspects of the illustrative embodiments may be implemented.

It can be appreciated that the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and any other embodiments in which prioritization of virtual processors for use of cache resources of physical processors in order to avoid cold cache starts may be utilized.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

One or more of the data processing systems depicted in FIGS. 1-2 may implement a virtual machine (VM) architecture in which logical partitions have one or more associated logical, or virtual, processors that share physical resources of the data processing systems. For example, one or more of the client devices 110, 112, and 114 in FIG. 1 may implement such an architecture, one or more servers 104 and 106 in FIG. 1 may implement such an architecture, or the data processing system 200 in FIG. 2 may implement such an architecture. As such, the data processing systems implementing such a VM architecture include a hypervisor or other virtualization intermediary that monitors, manages, and schedules the access of the logical or virtual processors to the physical resources of the system, e.g., the physical processors, caches, memory, etc.

Figure 3:
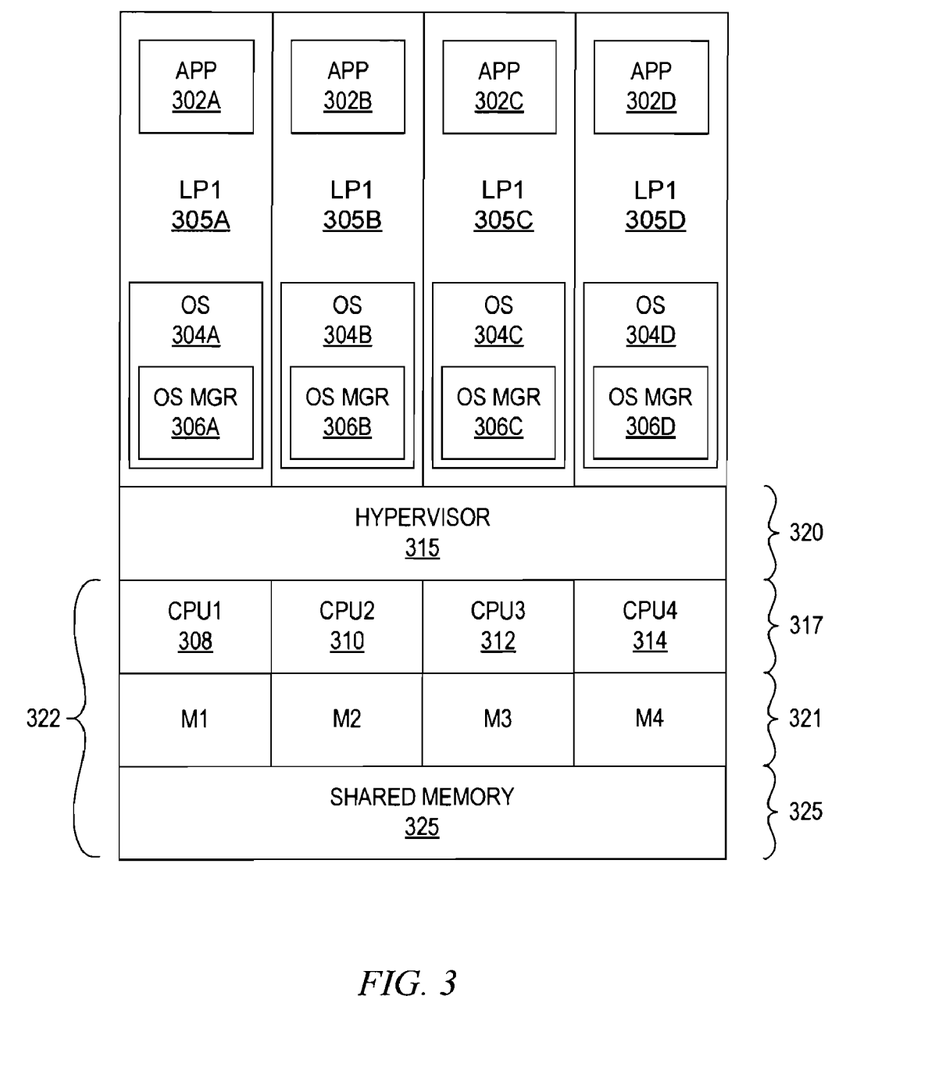
FIG. 3 is an example diagram of a virtual machine based system, also referred to herein as a virtual computing system, in accordance with one illustrative embodiment.

FIG. 3 is an example diagram of a virtual machine based system, also referred to herein as a virtual computing system, in accordance with one illustrative embodiment. As shown in FIG. 3, the virtual computing system 300 generally comprises firmware layer resources 320 including a hypervisor 315 as well as hardware layer resources 322 including a shared processor pool 317 and memory devices 321 and 325. Shared processor pool 317 preferably comprises a multiprocessor complex comprising multiple processors 308, 310, 312, and 314, designated CPU1-CPU4, respectively, and having respective processor-associated cache memories M1-M4 321. Virtual computing system 300 further comprises multiple logical partitions 305A-305D, designated LP1-LP4, respectively. Hypervisor 315 manages and adjusts assignment of hardware layer resources 322 among logical partitions 305A-305D.

CPU1-CPU4 and associated cache memories M1-M4 represent a portion of physical system resources allocated by hypervisor 315 to the logical partitions LP1-LP4 in a manner resulting in resource virtualization. Physical system resources are generally tangible system devices, components, and associated physical phenomena such as memory devices, processors, drivers, busses, processor/bus cycles, etc., as distinguished from non-physical, abstract system resources such as program layering organization and program protocols such as those associated with an operating system. Physical system resources are also distinguishable from logically or virtually definable entities such as virtual machines. Each of logical partitions LP1-LP4 includes one or more logical or virtual processors (not expressly depicted), each of which represents all or a portion of one of physical processors CPU1-CPU4 allocated to the logical partition. The virtual processors of a given one of the logical partitions 305A-305D may be dedicated to the partition, so that the underlying virtual processor resource is reserved for that logical partition, or may be shared so that the underlying virtual processor resource is available to other logical partitions.

In the depicted embodiment, each of logical partitions LP1-LP4 functions as a separate system having a resident operating system 304, which may differ among the logical partitions, and one or more applications 302. In one embodiment, one or more of operating systems 304A-304D may be the Linux operating system or the i5/OS™ operating systems offered by IBM Corporation. Additionally, operating systems 304A-304D (or a subset thereof) include respective OS workload managers 306A-306D for managing the application workload within each of the respective logical partitions.

In one embodiment, hypervisor 315 operates as a hidden partition having no entitled capacity. Allocation of system resources to logical partitions LP1-LP4 is managed by hypervisor 315, which may be implemented by microcode running on processors CPU1-CPU4. Hypervisor calls provide a means for any of operating systems 304A-304D to communicate with hypervisor 315, enabling more efficient usage of physical processor capacity by supporting the scheduling heuristic of minimizing logical partition idle time using techniques explained in further detail below. Logical partitions LP1-LP4 and hypervisor 315 typically comprise one or more tangible program modules residing in respective portions of the central memory associated with processors CPU1-CPU4.

Figure 4:
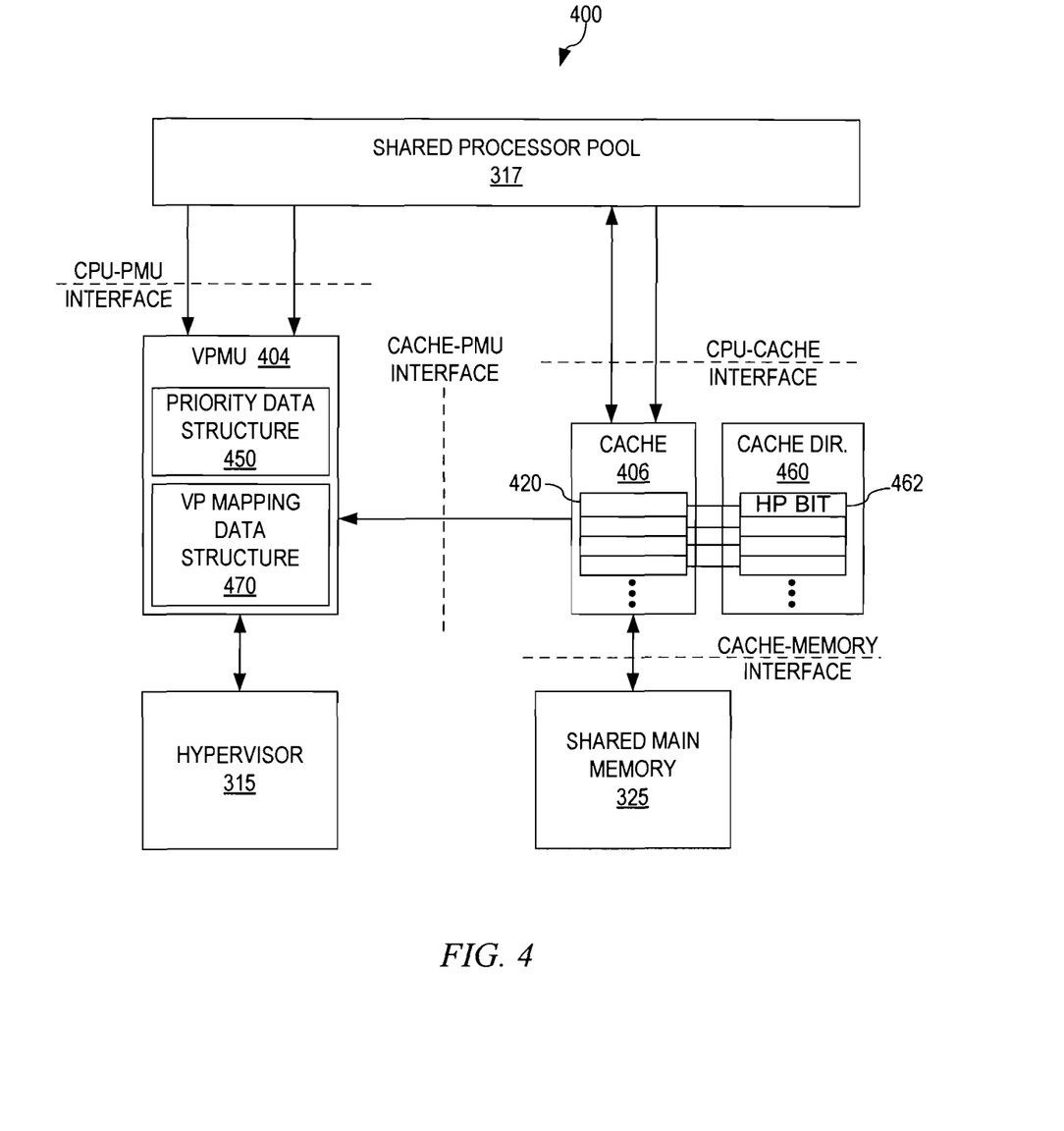
FIG. 4 is a high-level schematic diagram depicting an exemplary architecture adapted to facilitate virtual processor, and/or logical partition, scheduling in accordance with one illustrative embodiment.

FIG. 4 is a high-level schematic diagram depicting an exemplary architecture 400 adapted to facilitate virtual processor and/or logical partition scheduling in accordance with one illustrative embodiment. Partition scheduling architecture 400 integrates a virtual processor management unit (VPMU) 404 with other system components such as shared processor pool 317, hypervisor 315, and a cache memory 406. While VPMU 404 is depicted as a distinct module in FIG. 4, it should be noted that some or all of the hardware, firmware, and software components of VPMU 404 may be integrated within hypervisor 315. Furthermore, it should be noted that the cache block 406 is representative of some or all of the collective cache memory resources M1-M4 utilized by one or more of CPUs 308, 310, 312, and 314 contained within shared processor pool 317.

VPMU 404 includes logic, program modules, and other hardware, firmware, and/or software modules that monitor physical system resources allocated to logical partitions LP1-LP4. The high-level schematic of FIG. 4 illustrates the integration and interaction interfaces between VPMU 404 with the other system components enabling such monitoring of physical system resources associated with the logical partitions. The VPMU 404 stores, for each virtual processor, and/or logical partition, an indication of whether or not the virtual processor and/or logical partition is a high priority virtual processor or logical partition, in a priority data structure 450. In the case of logical partitions, all virtual processors associated with a logical partition are given the same priority level, e.g., either high priority or normal/lower priority. As additional logical partitions and/or virtual processors are generated in the system, the VPMU 404 may add additional entries to the priority data structure 450. Moreover, if the priority level of a virtual processor and/or logical partition is modified during the operation of the system, the priority data structure 450 may be updated to reflect any changes to these priority levels.

The priority levels assigned to virtual processors and/or logical partitions may be specified by a user or may be automatically set according to a policy or other automatic mechanism. For example, the priority level may be associated with a criticality of the applications running on the virtual processors and/or logical partitions. This criticality may be determined automatically based on the type of applications, criticality information associated with the applications, such as in the metadata associated with the application, or the like.

The VPMU 404, based on the priority levels assigned to virtual processors and/or logical partitions generates groups or domains of virtual processors. Preferably, these groups or domains comprise a combination of high priority and normal/lower priority virtual processors and/or logical partitions. Each group or domain may be associated with a particular set of one or more physical processors, associated caches, and other system resources. In this way an affinity of the virtual processors and/or logical partitions is created. It should be appreciated that such associations are strong bindings with the physical resources, but these associations may not be followed in situations where maximum system utilization require that the associations be violated.

As mentioned above, the caches of the physical processors are configured to allow high priority virtual processors and/or logical partitions to access the entire cache while normal/lower priority virtual processors and/or logical partitions are only permitted to access a sub-portion of the caches. In this way, when normal/lower priority virtual processors and/or logical partitions are dispatched during a dispatch window, the normal/lower priority virtual processors do not overwrite all of the cache lines of the cache and, as a result, cache lines that were populated by the high priority virtual processors are more likely to retain the data moved into the cache by the high priority processors. In this way, the high priority virtual processors, when dispatched, are more likely to start execution with a warm cache which results is greater performance of the high priority virtual processors since the latency and overhead associated with cache misses is reduced.

When a currently dispatched logical partition executes its instruction stream using a CPU from shared processor pool 317 and accesses the content of a memory location via load or store operations, the CPU issues these requests to its associated cache 406 through a CPU-cache interface 412. The task of cache 406 is then to determine whether the memory content is present in the cache's storage and, (a) if so, return the cached data to the CPU, or (b) if not, fetch the memory content from main memory, such as shared memory 325, before performing the load or store. If the requested memory content is already in cache 406, the data is returned to the CPU without accessing shared memory 325 such as via a cache-memory interface 410. If however, the requested data is not available in cache 406, the data must be fetched from main shared memory 325 through cache-memory interface 410. In addition, free space in the cache, to place the fetched data, must be found. In the case where there is not sufficient free space in the cache to store the fetched data, a cache line needs to be evicted from the cache (multiple layers of caches are present in a system such as L1, L2 and L3 caches) and sent either to a lower level cache (such as the L3 cache if the cache line is removed from the L2 cache) or stored in main memory if evicted from the L3 cache. In each level, in accordance with the illustrative embodiments, a portion of cache capacity (i.e. cache lines) can be reserved for high priority virtual processors.

From the above, it can be seen that if the retrieval of data from the main shared memory 325 can be avoided, the performance of the system is increased since the cache 406 provides a faster data access than the shared memory 325 and the overhead of retrieving the data from the main shared memory 325 into the cache 406 can be avoided. The mechanisms of the illustrative embodiments maximize avoidance of such retrievals of data form shared memory 325 during sharing of physical resources by virtual processors of one or more logical partitions.

In order for the cache 406 to distinguish between cache lines associated with high priority virtual processors and cache lines associated with normal/lower priority virtual processors, a cache directory 460 associated with the cache 406 is provided with an additional high priority bit 462 per cache line 420 in the cache 406 that indicates whether the cache line 420 is associated with high priority virtual processors or not. That is, a certain portion of the cache lines are determined to be high priority cache lines that are not to be evicted by normal/lower priority virtual processors. The high priority bit for these cache lines is set by the VPMU 404 or hypervisor 315 so that normal/lower priority virtual processors are not permitted to evict cache lines whose high priority bit is set. A cache eviction mechanism, such as a least recently used (LRU) mechanism or the like, is modified to recognize the high priority bit of the cache directory 460 and distinguish between cache lines that are able to be evicted by normal/lower priority virtual processors and those that are not able to be evicted because the high priority bit is set.

In one illustrative embodiment, the VPMU 404 receives user input, or automated input, indicating the priority of virtual processors and/or logical partitions in the data processing system. Based on these priorities, the VPMU 404 may determine a percentage of the cache 406 to assign exclusively to high priority virtual processors. This determination may be made with regard to each individual cache of each physical processor. It should be noted that in the case of a priority being assigned to a logical partition, the same priority may be assigned to all of the virtual processors of that logical partition.

Each of the virtual processors that have a high priority are assigned, by the VPMU 404, to at least one physical processor through a strong binding of the high priority virtual processor to the one or more physical processors. A strong binding is one in which the virtual processor has an affinity with the at least one physical processor such that when the virtual processor is dispatched, the hypervisor attempts to first execute the virtual processor on one of the one or more physical processors with which the virtual processor is bound. That is, the hypervisor basically assigns a physical processor as a home node to a virtual processor. This home node affinity is what the hypervisor attempts to enforce when it dispatches a virtual processor on a physical processor. Only if the virtual processor cannot execute on one of the one or more physical processors with which it is bound will the hypervisor attempt to execute the virtual processor on a different physical processor to which it is not bound, such as a physical processor in a pool of physical processors.

The VPMU 404 assigns virtual processors to physical processors based on comparison of the number of high priority virtual processors with the number of physical processors. The number of high priority virtual processors may be determined by grouping virtual processors according to the priority assigned to them and then determining a total number of virtual processors in each priority grouping. Once the number of high priority virtual processors is known, then, if the number of high priority processors is equal to the number of physical processors, then each of the high priority virtual processors are assigned to a separate one of the physical processors. If the number of high priority virtual processors is greater than the number of physical processors then an equal proportion of the higher priority virtual processors is bound to each of the physical processors as much as possible. That is, the high priority virtual processors are distributed to the physical processors in such a way that each physical processor is bound to one or more high priority virtual processors.

If there are fewer high priority virtual processors than there are physical processors, each high priority virtual processor is bound to one or more of the physical processors. Thus, a single high priority virtual processor can be bound to a plurality of physical processors. In such a case, an order of priority, such as primary home node, first secondary home node and nth secondary home node, may be utilized to distinguish which physical processor on which to run the virtual processor.

Once the high priority virtual processors are bound to one or more physical processors, the remaining normal/lower priority virtual processors are bound to the physical processors that already have one or more high priority virtual processors. In this way, groupings of virtual processors are created that each include both high priority and normal/lower priority virtual processors. By grouping high priority and normal/lower priority virtual processors together, a more optimum execution due to the partitioning of the physical cache into portions that are accessible by only high priority virtual processors and portions that are accessible by both high priority virtual processors and normal/lower priority virtual processors.

The assignment of virtual processors to physical processors is maintained in a virtual processor mapping data structure 470 maintained by the VPMU 404 or hypervisor. This data structure 470 may be used when determining to which physical processors to dispatch the virtual processors when it is time for the virtual processors to continue their execution. Thus, this data structure 470, by storing the correspondence between virtual processors and physical processors, essentially stores the groupings of virtual processors, wherein each grouping preferably includes a combination of virtual processors of different priority types. It should be appreciated, however, that in some instances it may not be possible for all groupings to have virtual processors of more than one priority type and thus, they may only comprise a single priority type, e.g., all high priority virtual processors or all normal/lower priority processors. In such cases, the benefits of the present invention may not be fully realized for these groups of virtual processors.

It should be noted that this grouping and assignment of virtual processors to physical processors is only an example implementation and the illustrative embodiments are not limited to such. Rather, other groupings and assignments of virtual processors to physical processors may be made without departing from the spirit and scope of the illustrative embodiments. Furthermore, more than two priority types may be used without departing from the spirit and scope of the illustrative embodiments. Preferably, in cases where more than two priority types are utilized, groupings of virtual processors assigned to physical processors include a combination of virtual processors having virtual processors from each of the priority types. Of course, other groupings that may be determined to be more optimal for a particular system architecture can be used without departing from the spirit and scope of the illustrative embodiments.

The VPMU 404 further determines an amount of the cache lines in each of the physical caches to assign to high priority virtual processors only. For example, the VPMU 404 may determined that x % of the cache lines in a physical cache associated with a physical processor are to be assigned to high priority virtual processors. This means that these cache lines are not able to be accessed by normal/lower priority virtual processors when they are dispatched to the associated physical processor. Thus, x % of the cache lines are assigned to high priority virtual processors and 100-x % of the cache lines are able to be accessed by both high priority virtual processors and normal/lower priority virtual processors. As a result, a portion, i.e. x %, of the cache is kept "warm" for high priority virtual processors in the event that they are dispatched to the physical processor again. This increases the performance of the high priority virtual processors while still allowing normal/lower priority virtual processors to execute using the physical processors.

When the VPMU 404 determines the x % of the cache lines to assign to high priority virtual processors, the VPMU 404 sets the special high priority bits in the cache directory for x % of the cache lines such that the high priority bits identify those cache lines as being accessible by the high priority virtual processors only. As a result, these cache lines cannot be evicted or overwritten by normal/lower priority virtual processors. That is, an eviction mechanism that may be used by the cache in response to notifications from virtual processors, such as a least recently used (LRU) mechanism, will not evict cache lines marked as high priority cache lines when a normal/lower priority virtual processor requests that the eviction mechanism evict a cache line for replacement of data from the system memory. The eviction mechanism is modified to recognize the settings of the high priority bits to distinguish between high priority and normal/lower priority virtual processor cache lines.

The percentage of cache lines assigned to high priority virtual processors only may be the same for all of the caches associated with the physical processors in the system or may be different for one or more of the caches assigned to one or more of the physical processors. For example, in some illustrative embodiments, the percentage of cache lines assigned to high priority virtual processors may be proportional to the number of high priority virtual processors bound to the physical processor. Thus, the percentage of high priority cache lines may be higher for physical processors that have a higher number of high priority virtual processors assigned to them. Other ways of determining the percentage of high priority cache lines for a particular physical cache of a physical processor may be used without departing from the spirit and scope of the illustrative embodiments.

Thus, with the mechanisms of the illustrative embodiments, a percentage of the cache is preserved when virtual processors are switched with regard to a physical processor executing these virtual processors. In this way, when a high priority virtual processor is again executed by the physical processor, there is a higher likelihood that data/instructions accessed by the high priority virtual processor is already present in the cache, thereby increasing the performance of the high priority virtual processor. Moreover, high priority virtual processors are grouped with normal/lower priority virtual processors to achieve greater optimization of the execution of these virtual processors. As noted above, the VPMU 404 may overwrite these mechanisms when system utilization is at issue, with a return to these mechanisms at a first opportunity.

Furthermore, as noted above, the VPMU 404 may be implemented as a portion of the hypervisor, or the functionality attributed to the VPMU 404 above may in fact be implemented by the hypervisor or other virtualization intermediary. Thus, the above is not intended to state or imply that the VPMU 404 must be a separate entity from the hypervisor or that a separate entity is necessary for performing the functionality of the illustrative embodiments.

Figure 5:
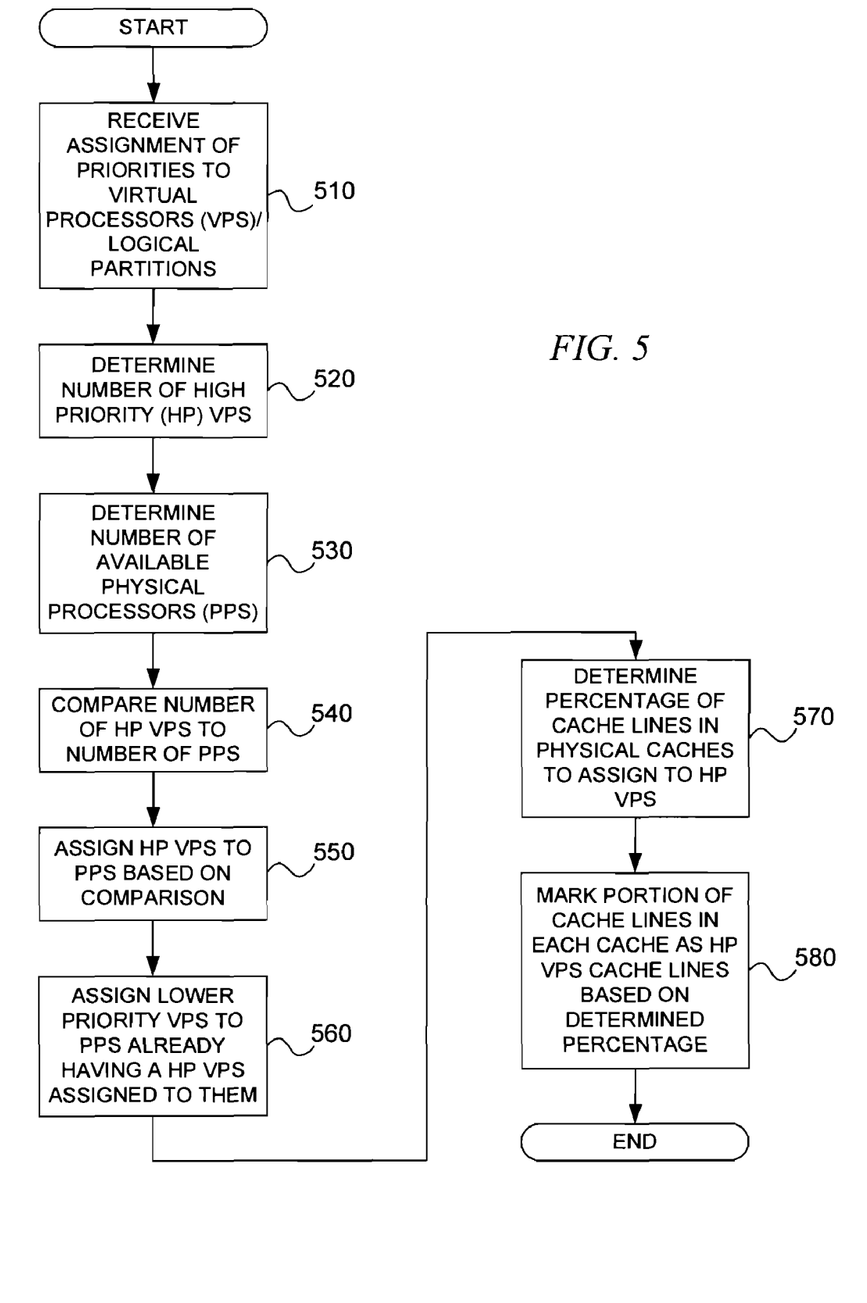
FIG. 5 is a flowchart outlining an example operation for carrying out the assignment of virtual processors to physical processors and caches in accordance with aspects of one illustrative embodiment.

FIG. 5 is a flowchart outlining an example operation for carrying out the assignment of virtual processors to physical processors and caches in accordance with aspects of one illustrative embodiment. The operation shown in FIG. 5 may be initiated periodically, in response to a user request, or in response to the occurrence of a predetermined event. For example, the operation shown in FIG. 5 may be initiated in response to the spawning of a new virtual processor in the data processing system, a user request to distribute virtual processors to physical resources, or the like.

As shown in FIG. 5, the operation starts with receiving an assignment of priorities to virtual processors of the data processing system (step 510). The assignment of priorities may be to the individual virtual processors or to logical partitions, in which case the priority assigned applies to all virtual processors of the logical partition. Based on the assignment of priorities, the number of high priority virtual processors is determined (step 520). A number of available physical processors in the data processing system is also determined (step 530).

The number of high priority virtual processors is compared to the number of available physical processors (step 540) and the high priority virtual processors are assigned to the physical processors based on the results of this comparison (step 550). Once the high priority virtual processors are assigned to physical processors, the normal/lower priority virtual processors are assigned to physical processors that already have a high priority virtual processor assigned to them (step 560).

A determination is made as to a percentage of cache lines in the physical caches of the physical processors to assign to only high priority virtual processors (step 570). This determination may be made on an individual basis for each of the physical processors based on the number of high priority virtual processors assigned to them or may be made on a global basis such that the same percentage applies to all of the physical caches of all of the physical processors, for example. A portion of the cache lines of the caches corresponding to the percentage of cache lines determined for that cache are then marked as high priority cache lines that cannot be evicted by normal/lower priority virtual processors (step 580). The operation then terminates.

It should be appreciated that while the flowchart shown in FIG. 5 terminates, the actual operation shown in FIG. 5 may be performed multiple times in response to any of event, user input, or the like, that may initiate the operation shown in FIG. 5. Moreover, once the caches are configured in the way noted above based on the percentage of cache lines assigned to high priority virtual processors and the virtual processors are assigned to physical processors in the manner above, the VPMU or hypervisor may manage the use of the caches according to these configurations and assignments. Thus, if a normal/lower priority virtual processor attempts to evict a cache line that is marked as high priority only, the eviction operation will fail and instead a cache line that is accessible by normal/lower priority virtual processors will be evicted. As a result, high priority only cache lines are kept "warm" for the high priority virtual processors.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having at least one physical processor and at least one associated cache memory, for allocating cache resources of the at least one cache memory to virtual processors of the data processing system, comprising:
    identifying, by a management mechanism of the data processing system, a plurality of high priority virtual processors in the data processing system;
    determining, by the management mechanism, a percentage of cache lines of the at least one cache memory to be assigned to high priority virtual processors based on the identification of the plurality of high priority virtual processors in the data processing system; and
    marking, by the management mechanism, a portion of the cache lines in the at least one cache memory as being evictable by only high priority virtual processors based on the determined percentage of cache lines to be assigned to high priority virtual processors, wherein the marked portion of the cache lines cannot be evicted by lower priority virtual processors having a priority lower than the high priority virtual processors.

2. The method of claim 1, wherein the at least one cache memory is configured to permit high priority virtual processors to evict any of the cache lines of the at least one cache memory.

3. The method of claim 1, further comprising:
    assigning high priority virtual processors to one or more physical processors in the at least one physical processor of the data processing system based on total number of high priority virtual processors identified by the management mechanism.

4. The method of claim 3, wherein the high priority virtual processors are assigned to one or more physical processors based on a comparison of a number of the plurality of high priority virtual processors to a number of physical processors in the at least one physical processor.

5. The method of claim 4, wherein:
    in response to the comparison indicating that there are equal numbers of high priority virtual processors and physical processors, each high priority virtual processor is assigned to a separate one of the physical processors,
    in response to the comparison indicating that there is a greater number of high priority virtual processors than physical processors, the high priority virtual processors are assigned to physical processors in approximately an equal proportion, and
    in response to the comparison indicating that there is a lower number of high priority virtual processors than physical processors, assigning each of the high priority virtual processors to one or more of the physical processors.

6. The method of claim 3, further comprising:
    assigning one or more lower priority virtual processors to one or more of the physical processors in the at least one physical processor, that already have a high priority virtual processor assigned to those physical processors.

7. The method of claim 1, wherein the percentage of cache lines of the at least one cache memory to be assigned to high priority virtual processors is determined based on a number of the identified plurality of high priority virtual processors.

8. The method of claim 1, further comprising:
    receiving an assignment of priority levels to each of the virtual processors of the data processing system, wherein the assignment is received from one of user input or an automatic mechanism.

9. The method of claim 8, further comprising:
    generating one or more domains of virtual processors based on the assignment of priority levels to the virtual processors, wherein each of the one or more domains comprises at least two virtual processors having different priority levels; and
    assigning each of the one or more domains of virtual processors to a physical processor in a plurality of physical processors of the data processing system.

10. The method of claim 1, wherein marking a portion of the cache lines in the at least one cache memory comprises setting a high priority bit, for each cache line in the portion of the cache lines, in a cache directory associated with the at least one cache memory, and wherein a cache eviction mechanism of the data processing system, when performing a cache eviction operation:
    accesses and recognizes a setting of the high priority bits in the cache directory, and
    distinguishes between cache lines that are able to be evicted by lower priority virtual processors and those that are not able to be evicted because the high priority bit is set.

11. A computer program product comprising a computer non-transitory readable storage medium having a computer readable program stored therein, wherein the computer readable program, when executed on a computing device, causes the computing device to:
    identify a plurality of high priority virtual processors in the computing device;
    determine a percentage of cache lines of the at least one cache memory to be assigned to high priority virtual processors based on the identification of the plurality of high priority virtual processors; and
    mark a portion of the cache lines in the at least one cache memory as being evictable by only high priority virtual processors based on the determined percentage of cache lines to be assigned to high priority virtual processors, wherein the marked portion of the cache lines cannot be evicted by lower priority virtual processors having a priority lower than the high priority virtual processors.

12. The computer program product of claim 11, wherein the at least one cache memory is configured to permit high priority virtual processors to evict any of the cache lines of the at least one cache memory.

13. The computer program product of claim 11, wherein the computer readable program further causes the computing device to:
assign high priority virtual processors to one or more physical processors in the at least one physical processor of the data processing system based on total number of high priority virtual processors identified by the management mechanism.

14. The computer program product of claim 13, wherein the high priority virtual processors are assigned to one or more physical processors based on a comparison of a number of the plurality of high priority virtual processors to a number of physical processors in the at least one physical processor.

15. The computer program product of claim 14, wherein:
in response to the comparison indicating that there are equal numbers of high priority virtual processors and physical processors, each high priority virtual processor is assigned to a separate one of the physical processors,
in response to the comparison indicating that there is a greater number of high priority virtual processors than physical processors, the high priority virtual processors are assigned to physical processors in approximately an equal proportion, and
in response to the comparison indicating that there is a lower number of high priority virtual processors than physical processors, assigning each of the high priority virtual processors to one or more of the physical processors.

16. The computer program product of claim 13, wherein the computer readable program further causes the computing device to:
assign one or more lower priority virtual processors to one or more of the physical processors in the at least one physical processor, that already have a high priority virtual processor assigned to those physical processors.

17. The computer program product of claim 11, wherein the percentage of cache lines of the at least one cache memory to be assigned to high priority virtual processors is determined based on a number of the identified plurality of high priority virtual processors.

18. The computer program product of claim 11, wherein the computer readable program further causes the computing device to:
receive an assignment of priority levels to each of the virtual processors of the data processing system, wherein the assignment is received from one of user input or an automatic mechanism.

19. The computer program product of claim 18, wherein the computer readable program further causes the computing device to:
generate one or more domains of virtual processors based on the assignment of priority levels to the virtual processors, wherein each of the one or more domains comprises at least two virtual processors having different priority levels; and
assign each of the one or more domains of virtual processors to a physical processor in a plurality of physical processors of the data processing system.

20. The computer program product of claim 11, wherein the computer readable program causes the computing device to marking a portion of the cache lines in the at least one cache memory by setting a high priority bit, for each cache line in the portion of the cache lines, in a cache directory associated with the at least one cache memory, and wherein a cache eviction mechanism of the data processing system, when performing a cache eviction operation:
accesses and recognizes a setting of the high priority bits in the cache directory, and
distinguishes between cache lines that are able to be evicted by lower priority virtual processors and those that are not able to be evicted because the high priority bit is set.

21. An apparatus, comprising:
a processor; and
a memory coupled to the processor, wherein the memory comprises instructions which, when executed by the processor, cause the processor to:
identify a plurality of high priority virtual processors of the apparatus;
determine a percentage of cache lines of the at least one cache memory to be assigned to high priority virtual processors based on the identification of the plurality of high priority virtual processors; and
mark a portion of the cache lines in the at least one cache memory as being evictable by only high priority virtual processors based on the determined percentage of cache lines to be assigned to high priority virtual processors, wherein the marked portion of the cache lines cannot be evicted by lower priority virtual processors having a priority lower than the high priority virtual processors.

* * * * *